July 10, 1951 — M. E. WATERS — 2,559,742
TOOL HOLDER
Filed May 12, 1950
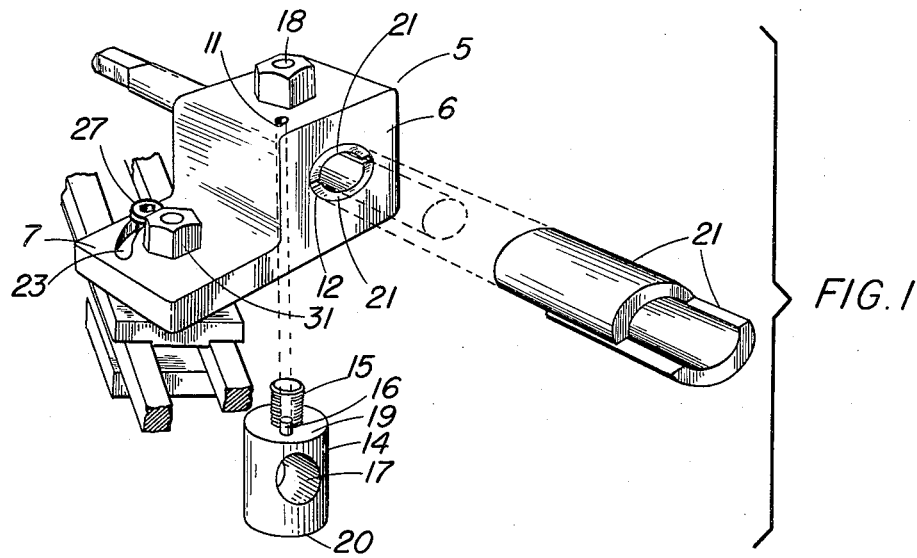
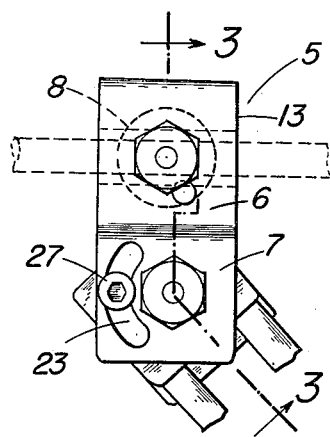
FIG. 2
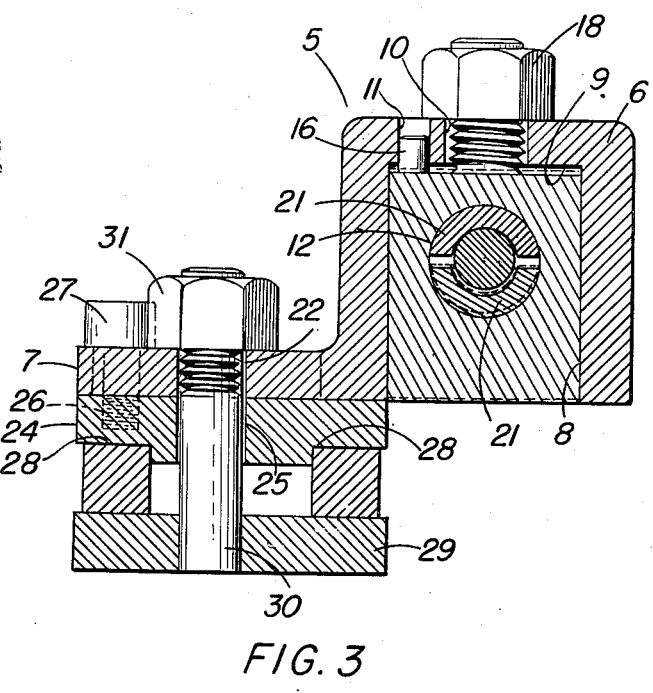
FIG. 3
INVENTOR.
Maynard E. Waters
BY Edward G. Roe
Attorney

UNITED STATES PATENT OFFICE 2,559,742

TOOLHOLDER

Maynard E. Waters, Norwich, N. Y.

Application May 12, 1950, Serial No. 161,669

2 Claims. (Cl. 279—9)

The invention relates to tool holders for use with engine-lathes.

The term "tool" is intended to include "boring bars," "boring tools" and all tools capable of working on materials, including but not limited to metals, with the tools fixedly held, and the work rotated by the chuck. The compound and the tool holder fixed thereon is moved on the carriage toward the work as the work rotates.

Heretofore, tool holders mounted on and attachable to lathe compounds have been subject to certain inherent disadvantages. For example, the tools at times slip from the work, as the lathe compound moves inward thereof, due to failure of the tool holder to grip the tool in a decisive fashion. Further, necessary adjustments of the tool holder cannot be accomplished with facility, because of the make-up of the holder. Additionally, the slot in the conventional holder tends to become clogged with chips of material from the work. And finally, the means for adjusting the tool holders do not permit of the maximum desired range of adjustment of the boring bar, or tool.

I have invented a tool holder which eliminates the aforesaid and other known disadvantages of conventional holders and has for its principal objects the following:

One principal object of the invention is the provision of a holder, which I style a swivel tool holder, in which the optimum of facility and range of adjustment of the fixed or held tool is obtainable; another object contemplates the maximum of surety of gripping of the tool and preclusion of slipping or other undesired movement. A still further object comprehends the prevention of accumulation in the holder of chips from the work, and finally the tool holder is adapted to be used on any size lathe.

These and other objects of the invention will be apparent after a description of the invention, taken together with the drawings, unfolds. Briefly described, the tool holder includes a flanged housing, a yoke having an upwardly extending threaded shank or stem cooperatively receivable within the housing, a passage through the housing and yoke, a split sleeve therewithin adapted to grip and hold a tool placed through the passage. The flange is provided with a segmented slot, and a pair of plates therebeneath for clamping the holder on a lathe compound.

In the drawings:

Fig. 1 is a perspective view of the tool holder, shown partly exploded.

Fig. 2 illustrates a plan view of the invention.

Fig. 3 is a sectional view along line 3—3 on Fig. 2.

Referring to the drawings, the numeral 5 denotes the swivel tool holder generally, said holder including a housing 6 having lower horizontal flange or extension 7 integrally formed therewith.

Housing 6 which may have bevelled upper edges presents a block-like exterior configuration and interiorly is horizontally and centrally bored as at 8, said bore terminating short of the top 9 of the housing, with relatively smaller bore 10 extending through the top and bore 11 of less diameter than that of 10 spaced therefrom and also extending either partially in or through the top 9 for purposes hereinafter explained.

Cooperating with bores 8, 10, 11 and horizontally extending cylindrical opening 12 in the side walls 13 of housing 6 is journaled pistonlike yoke 14 having threaded and centrally disposed shank 15 and offset stem 16. Yoke 14 is horizontally bored at 17, the latter bore being of the same diameter as openings 12 and registering therewith when yoke 14 is seated within the housing, with stem 16 slidably receivable within bore 11, and threaded extension extending through bore or opening 10.

Bore 11 and stem 16 are positioned so that when yoke 14 is seated home, bores 17 and openings 12 register to a nicety, with stem 16 receivable within cooperating bore 11 precluding rotation of yoke 14 when nut 18 threaded to mate the threads of shank 15 is tightened, by a lever wrench or other appropriate tool. The heighth of yoke 14 from shoulder 19 to the bottom 20 is slightly less than the depth of bore 8 so that when nut 18 is taken up, split sleeve 21, which extends through housing 6 and within the housing through yoke 14, is caused to exert a powerful gripping force upon a tool B by the upward pull of the yoke 14 closing and clamping the said split sleeve upon the boring bar. And split sleeve 21 may be made with varying inside diameters, as will be readily understood, to accommodate different tool dimensions.

In addition, split sleeves 21 may be provided with slightly varying outside diameters so that, when desired, a boring bar held by the holder, may be raised or lowered slightly by changing sleeves 21, rotating the bar before tightening nut 18, to create two new axis with respect to the rotating work. This is a capital advantage, particularly in watchmaking, where raising or lowering the axis and changing the axis even a few thousandths of an inch would considerably facilitate working on minute parts.

Reverting to horizontal extension 7 of housing 6—this is centrally bored as at 22, and also has segmented slot 23. Beneath and cooperating with the flange or extension 7, I provide base plate 24, also centrally bored at 25, threaded as at 26, to provide a seat for threaded bolt fixing 27, which may be an "Allen" cap screw, adapted to be set in 26 for maximum relative adjustment of boring bar holder 5, by the swiveling of housing 6 on threaded bolt 30 throughout the arc defined by slot 23.

The bottom of base plate 24 is recessed to provide shoulders 28 adapted to be seated upon the opposite sides of the slot—the compound of a lathe indicated by the letter S and below and cooperating with flange 7 and base plate 24, I provide clamping plate 29 having integrally formed, upwardly disposed, threaded bolt 30, extending through base plate 24 and flange 7, permitting housing 6 to swivel on plate 24 for desired adjustment. As will be readily apparent to those skilled in the art, the swivel boring bar holder 5 may be quickly attached to the compound of a lathe (not shown) by tightening hex nut 31, threaded for engagement with bolt 30, thus causing plates 23 and 29 to grip the compound S therebetween and to hold flange 7 and integral housing 6 firmly on the compound. To permit of the employment of the same lever hex wrench for tightening hex nuts 18 and 31, they may be of the same dimension.

With flange 7 swiveled on bolt 30, a 360° adjustment of the housing 6 is possible and with nut 31 turned home, any untoward rotation of said housing is positively precluded by application of an "Allen" wrench to cap screw, or bolt fixing 25, and tightening thereof.

The swivel tool holder may be fabricated of an alloy steel of suitable strength, or other metals having the desired characteristics of rigidity, resistance to vibration and which is absolutely devoid of any tendency to fracture.

Manifestly, as will be apparent to those skilled in the art, when it is desired to attach swivel tool holder 5 to a lathe, clamping plate 29 is loosened, and said plate, with the cooperating upwardly disposed members of the tool holder spread apart therefrom—is slid in the slotted channel of the lathe compound as suggested by the letter S; when positioned on the compound hex nut 31 is tightened, securely fixing the tool holder on the compound through the clamping action of plate 29, held beneath the ledges of the slotted channel of the lathe compound, with base plate 24 above and flange 7 on top, all drawn tightly together by the tightening of hex nut 31.

Upon selection of the desired tool B—this may with the utmost celerity, thrust between the split sleeve 21, and nut 18 taken up, securely fixing the tool in the holder.

With the compound manually moved adjacent the work, any desired adjustment of the tool may be made by swiveling housing 6 after loosening cap screw 27 and nut 31.

The tool holder permits, as hereinbefore stated, the widest possible range of adjustment; the holder is compact, exceedingly strong, and admits of ease of manipulation. As those skilled in the art will understand, by turning the lathe compound, the tool holder may be adjusted so that the boring bar or tool is positioned parallel to the lathe.

The overall size of the tool holder may be modified, including the size and shape of the plates beneath the flange, so that various sizes of lathe compounds may be fitted.

I reserve the right to make such changes and modifications as may come within the scope of the appended claims.

I claim:

1. A tool holder including, in combination: a housing of block-like configuration having a lower horizontal extension, said housing horizontally and vertically bored, and having a pair of smaller bores, extending from the central bore; a yoke of less length than the vertical bore of the housing having a vertically extending shank and a stem journaled in said housing and precluded against rotatable movement by the said stem, said yoke horizontally bored to register with the horizontal bore of the housing; split sleeves of slightly varying diameters receivable in the registering bore of the yoke and the housing; a nut threaded to mate the shank of the yoke; said lower horizontal extension provided with a central bore and an offset segmented slot; a centrally bored base plate beneath the said extension provided with a bolt fixing for travel in the segmented slot, the bottom portion of said plate provided with shoulders; a clamping plate therebeneath provided with an upwardly extending bolt extending through the base plate and the flange extension of the housing and provided with a nut threaded thereon; one of the split sleeves adapted to receive and hold a tool therebetween upon tightening of the nut threaded on the shank of the yoke; and the said yoke adapted to be raised and lowered upon changing the split sleeve to one having a different diameter and the tool rotated to provide two additional and different adjustments.

2. A swivel tool holder for use with an engine-lathe having a rotating chuck for holding the work and a compound for movement toward said work comprising a housing having a lower horizontally extending flange, a horizontal, medially disposed passage through two opposing side walls of the housing, the housing centrally and vertically bored from the bottom to short of the top and having a centrally disposed smaller bore through the top and a still smaller vertical bore through the top offset from said last mentioned bore, a cylindrical-like yoke of less length than the first mentioned vertical bore of the housing horizontally bored to register with the horizontal passage through the housing, journaled in the central bore of the housing and having an upwardly and centrally disposed threaded shank extending through the first mentioned vertical bore of the housing, a stem registering with the second mentioned vertical bore, split sleeves of slightly varying diameters receivable in the registering passage through the housing and the yoke, a nut threaded to mate the threads of the shank, means swiveled to the flange of the housing whereby said housing may be fixed to the compound of the lathe, and adjusted with relation to the work, and the said yoke adapted to be raised and lowered upon changing the split sleeve to one having a different diameter and the tool rotated to provide two additional and different adjustments.

MAYNARD E. WATERS.

REFERENCES CITED

The following references are of record in the file of this patent:

UNITED STATES PATENTS

| Number | Name | Date |
|---|---|---|
| 55,656 | Hoar | June 9, 1866 |
| 77,289 | Jameson | Apr. 28, 1868 |
| 807,315 | Perron et al. | Dec. 12, 1905 |
| 965,893 | Hanson | Aug. 2, 1910 |
| 1,744,521 | Briese et al. | Jan. 21, 1930 |